United States Patent
Sun et al.

(10) Patent No.: US 9,321,673 B2
(45) Date of Patent: Apr. 26, 2016

(54) NEAR-INFRARED ABSORPTION GLASS, ELEMENT AND FILTER

(71) Applicant: CDGM GLASS CO., LTD., Chengdu (CN)

(72) Inventors: Wei Sun, Chengdu (CN); Yu Deng, Chengdu (CN)

(73) Assignee: CDGM GLASS CO., LTD., Chengdu (CN)

( * ) Notice: Subject to any disclaimer, the term of this patent is extended or adjusted under 35 U.S.C. 154(b) by 451 days.

(21) Appl. No.: 13/622,084

(22) Filed: Sep. 18, 2012

(65) Prior Publication Data

US 2013/0214218 A1 Aug. 22, 2013

(30) Foreign Application Priority Data

Feb. 17, 2012 (CN) .......................... 2012 1 0036840

(51) Int. Cl.
*C03C 3/247* (2006.01)
*C03C 4/08* (2006.01)

(52) U.S. Cl.
CPC .................. *C03C 3/247* (2013.01); *C03C 4/082* (2013.01)

(58) Field of Classification Search
CPC .......... C03C 3/17; C03C 3/247; C03C 4/082; G02B 5/22; G02B 5/226
See application file for complete search history.

(56) References Cited

U.S. PATENT DOCUMENTS

| 5,242,868 | A * | 9/1993 | Hara ....................... C03C 3/247 501/44 |
| 6,225,244 | B1 * | 5/2001 | Oguma ........................... 501/45 |
| 2004/0082460 | A1 * | 4/2004 | Yamane et al. ................. 501/48 |
| 2009/0247386 | A1 * | 10/2009 | Ikenishi .......................... 501/44 |
| 2009/0247387 | A1 * | 10/2009 | Ikenishi .......................... 501/44 |
| 2012/0241697 | A1 * | 9/2012 | Ohkawa et al. ............... 252/587 |
| 2013/0135714 | A1 * | 5/2013 | Kondo et al. ................. 359/359 |

FOREIGN PATENT DOCUMENTS

| CN | 102603188 A * | 7/2012 |
| CN | 102603189 A * | 7/2012 |
| WO | WO 2011071157 A1 * | 6/2011 |
| WO | WO 2012018026 A1 * | 2/2012 |

* cited by examiner

*Primary Examiner* — Elizabeth A Bolden
(74) *Attorney, Agent, or Firm* — Caesar Rivise, PC

(57) ABSTRACT

The invention provides a near-infrared absorption glass, a near-infrared absorption element and a near-infrared absorption filter each with good chemical stability and transmissivity property in the visible range. When such glass is 1 mm thick, the transmissivity of such glass is more than 80% at 400 nm, and more than 85% at 500 nm. The near-infrared absorption glass comprises cations such as $P^{5+}$, $Al^{3+}$, $Li^+$, $R^{2+}$ and $Cu^{2+}$ as well as anions such as $O^{2-}$ and $F^-$, wherein the $R^{2+}$ refers to $Mg^{2+}$, $Ca^2$, $Sr^{2+}$ and $Ba^{2+}$, and wherein the content of the said $Li^+$ is 1-15%. Furthermore, the water resistant stability $D_W$ of the said near-infrared absorption glass is Class 1 and the acid resistant stability $D_A$ is above Class 4.

21 Claims, 1 Drawing Sheet

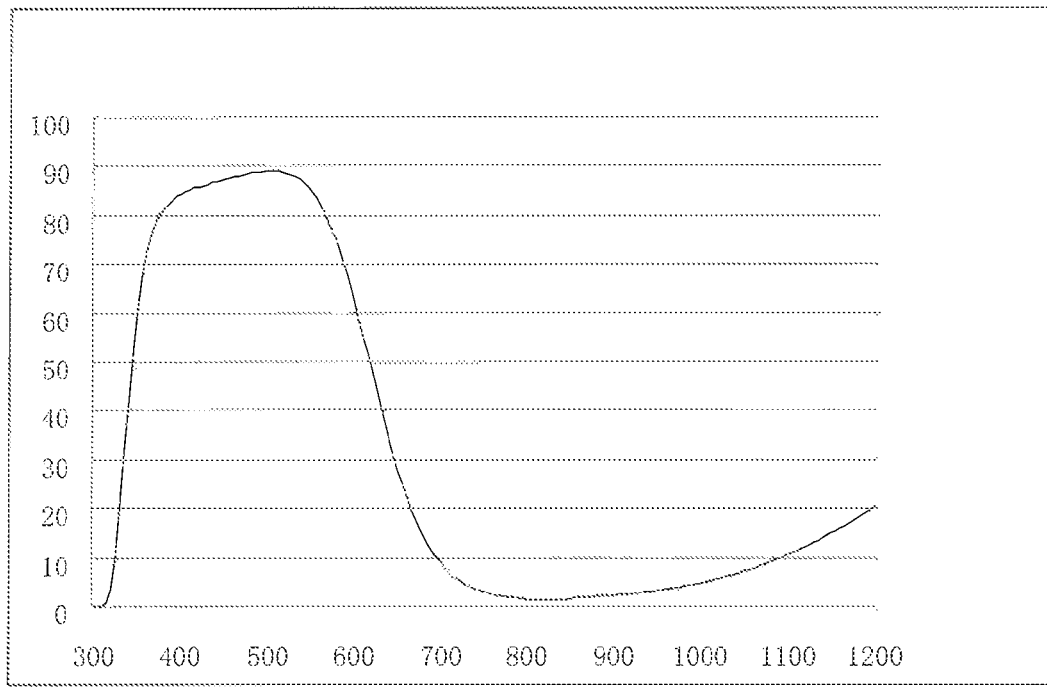

NEAR-INFRARED ABSORPTION GLASS, ELEMENT AND FILTER

BACKGROUND OF THE INVENTION

1. Field of the Invention

The invention relates to a near-infrared absorption glass, a near-infrared absorption element and a near-infrared absorption filter. More specifically, the invention relates to a near-infrared absorption glass provided with good chemical stability and employed in the near-infrared absorption filter suitable for color sensitivity correction, and a near-infrared absorption element or a near-infrared absorption filter each comprising such glass.

2. Background of the Invention

In recent years, the spectral sensitivity of semiconductor image pickup elements such as CCD and CMOS employed in digital cameras and VTR cameras run from visible to near-infrared range around 1,100 nm. Accordingly, filters absorbing light in the near-infrared range approximating the visual sensitivity of humans are employed to obtain images. Thus filters used for color sensitivity correction become more and more in demand, which in turn poses higher requirements on the near-infrared absorption glass. It is required that the near-infrared absorption glass used for manufacturing such filters possess good transmission property in the visible range.

In prior art, near-infrared absorption glass is manufactured by adding $Cu^{2+}$ to phosphate glass or fluorophosphate glass. The chemical stability of the phosphate glass is inferior to that of the fluorophosphate glass. Defects such as cracks and white cloud points occur on the surface of the glass upon long-term exposure to high humidity or high temperature.

SUMMARY OF THE INVENTION

The technical problem to be solved in this invention is to provide a near-infrared absorption glass, a near-infrared absorption element and a near-infrared absorption filter each with good chemical stability and good transmission property in the visible range.

The technical solution used for solving the above technical problem in this invention is the near-infrared absorption glass of the current invention wherein the glass is 1 mm thick, the transmissivity of such glass is more than 80% at a wavelength of 400 nm, and more than 85% at a wavelength of 500 nm; further wherein the said near-infrared absorption glass comprises cations $P^{5+}$, $Al^{3+}$, $Li^+$, $R^{2+}$ and $Cu^{2+}$ as well as anions $O^{2-}$ and $F^-$, wherein the said $R^{2+}$ refers to $Mg^{2+}$, $Ca^{2+}$, $Sr^{2+}$ and $Ba^{2+}$, and the content of the said $Li^+$ is 1-15%; the water resistant stability $D_W$ of the said near-infrared absorption glass reaches Class 1 and acid resistant stability $D_A$ is above Class 4.

Further, when the near-infrared absorption glass is 1 mm thick, the transmissivity is more than 88% at a wavelength of 400 nm, and more than 90% at a wavelength of 500 nm.

Further, the near-infrared absorption glass comprises 15-35% of $P^{5+}$, 5-20% of $Al^{3+}$, 1-15% of $Li^+$, 0-10% of $Na^+$, 30-65% of $R^{2+}$ and 0.1-8% of $Cu^{2+}$.

Further, the near-infrared absorption glass comprises 15-35% of $P^{5+}$, 5-20% of $Al^{3+}$, 1-10% of $Li^+$, 0-10% of $Na^+$, 30-65% of $R^{2+}$ and 0.1-8% of $Cu^{2+}$.

Further, the near-infrared absorption glass comprises 15-35% of $P^{5+}$, 5-20% of $Al^{3+}$, 2-5% of $Li^+$, 0-10% of $Na^+$, 30-65% of $R^{2+}$ and 0.1-8% of $Cu^{2+}$.

Further, the near-infrared absorption glass comprises 20-30% of $P^{5+}$, 10-15% of $Al^{3+}$, 1-15% of $Li^+$, 0-5% of $Na^+$, 40-65% of $R^{2+}$, and 1.2-5% of $Cu^{2+}$.

Further, the near-infrared absorption glass comprises 20-30% of $P^{5+}$, 10-15% of $Al^{3+}$, 1-10% of $Li^+$, 0-5% of $Na^+$, 40-65% of $R^{2+}$, and 1.2-5% of $Cu^{2+}$.

Further, the near-infrared absorption glass comprises 20-30% of $P^{5+}$, 10-15% of $Al^{3+}$, 2-5% of $Li^+$, 0-5% of $Na^+$, 40-65% of $R^{2+}$, and 1.2-5% of $Cu^{2+}$.

Further, the near-infrared absorption glass comprises 21-25% of $P^{5+}$, 10-15% of $Al^{3+}$, 1-15% of $Li^+$, 0.5-3% of $Na^+$, 54-65% of $R^{2+}$, and 1.2-5% of $Cu^{2+}$.

Further, the near-infrared absorption glass comprises 21-25% of $P^{5+}$, 10-15% of $Al^{3+}$, 1-10% of $Li^+$, 0.5-3% of $Na^+$, 54-65% of $R^{2+}$, and 1.2-5% of $Cu^{2+}$.

Further, the near-infrared absorption glass comprises 21-25% of $P^{5+}$, 10-15% of $Al^{3+}$, 2-5% of $Li^+$, 0.5-3% of $Na^+$, 54-65% of $R^{2+}$, and 1.2-5% of $Cu^{2+}$.

Further, the near-infrared absorption glass comprises 15-35% of $P^{5+}$, 5-20% of $Al^{3+}$, 1-15% of $Li^+$, 0-10% of $Na^+$, 0-3% of $K^+$, 0.1-8% of $Cu^{2+}$, 0.1-10% of $Mg^{2+}$, 1-20% of $Ca^{2+}$, 15-35% of $Sr^{2+}$ and 10-30% of $Ba^{2+}$.

Further, the near-infrared absorption glass comprises 20-30% of $P^{5+}$, 10-15% of $Al^{3+}$, 1-10% of $Li^+$, 0-5% of $Na^+$, 0-3% of $K^+$, 1.2-5% of $Cu^{2+}$, 2-8% of $Mg^{2+}$, 5-15% of $Ca^{2+}$, 21-30% of $Sr^{2+}$, and 15-30% of $Ba^{2+}$.

Further, the near-infrared absorption glass comprises 21-25% of $P^{5+}$, 10-15% of $Al^{3+}$, 2-5% of $Li^+$, 0.5-3% of $Na^+$, 1.8-3% of $Cu^{2+}$, 3-7% of $Mg^{2+}$, 7-11% of $Ca^{2+}$, 23-28% of $Sr^{2+}$, and 21-30% of $Ba^{2+}$.

Further, the near-infrared absorption glass comprises 21-25% of $P^{5+}$, 10-15% of $Al^{3+}$, 2-5% of $Li^+$, 0.5-3% of $Na^+$, 1.8-3% of $Cu^{2+}$, 3-7% of $Mg^{2+}$, 7-11% of $Ca^{2+}$, 23-28% of $Sr^{2+}$, and 21-25% of $Ba^{2+}$.

Further, the near-infrared absorption glass is characterized in that $F^-$ content is 45-60%, and $O^{2-}$ content is 40-55%.

Further, $F^-$ content is 48-57%, and $O^{2-}$ content is 43-52%.

Further, $F^-$ content is more than 50% but no greater than 57%, and $O^{2-}$ content is no less than 43% but less than 50%.

Further, $F^-$ content is 51-55%, and $O^{2-}$ content is 45-49%.

Further, $F^-$ content is 51-53%, and $O^{2-}$ content is 47-49%.

A near-infrared absorption element comprises the near-infrared absorption glass.

A near-infrared absorption filter comprises the near-infrared absorption glass.

The invention has the following advantages: fluophosphate glass is used as matrix glass to reduce the content of the cation $Li^+$ and to effectively improve the chemical stability of the near-infrared absorption glass, i.e. water resistant stability $D_W$ reaches Class 1 and acid resistant stability $D_A$ reaches or is above Class 3; on the other hand, the $R^{2+}$ content is increased in the fluophosphate matrix glass to increase the alkali content of glass liquid and to suppress the reduction of $Cu^{2+}$ to $Cu^+$, thereby providing good near-infrared absorptivity for the glass. When the glass according to the invention is 1 mm thick, the transmissivity is more than 80% at a wavelength of 400 nm, and more than 85% at a wavelength of 500 nm; in spectrum transmissivity at wavelength of 500-700 nm, the wavelength corresponding to the transmissivity of 50% (i.e. the wavelength value corresponding to $\lambda_{50}$) is 615±10 nm.

DESCRIPTION OF DRAWINGS

FIG. 1 shows the spectrum transmissivity curve of the near-infrared absorption glass according to Example 1 of the invention.

DETAILED DESCRIPTION OF THE INVENTION

The near-infrared absorption glass of the invention is made by using fluorophosphate glass as the matrix glass and adding $Cu^{2+}$ with near-infrared absorption effect.

Hereinafter, cation content is percentage by weight of the cation to all cations, and anion content is percentage by weight of the anion to all anions.

$P^{5+}$ is a key ingredient of the fluorophosphate glass, and is an important component providing absorption in an infrared area. When its content is less than 15%, the absorptivity in the near-infrared range is low, the color correction properties are poor, and the glass shows a green coloration. When its content is over 35%, devitrification resistance and chemical stability are poor. Therefore, $P^{5+}$ content is limited to 15-35%, preferably 20-30%, and more preferably 21-25%.

$Al^{3+}$ is a component improving glassing property, chemical stability and thermal shock resistance of the fluorophosphate glass. When $Al^{3+}$ content is less than 5%, the above effects are not achieved, when the $Al^{3+}$ content is more than 20%, near-infrared absorption is reduced. Therefore, the $Al^{3+}$ content is 5-20%, and preferably 10-15%.

$Li^+$, $Na^+$ and $K^+$ are components that improve glass meltability, glassing property and transmissivity in the visible light range. When they are separately introduced, $Li^+$ provides better chemical stability to the glass in comparison with $Na^+$ and $K^+$. When $Li^+$ content is more than 15%, chemical stability and processability are poor. Therefore the $Li^+$ content is 1-15%, preferably 1-10%, and more preferably 2-5%.

A small amount of $Na^+$ and $Li^+$ are preferably added in the invention to effectively improve the chemical stability of the glass. $Na^+$ is added to further improve meltability and devitrification resistance. The $Na^+$ content is 0-10%, preferably 0-5%, more preferably 0.5-3%. The $K^+$ content is 0-3%. Above 3%, chemical stability and processability are poor.

$R^{2+}$ is a component that improves the glassing property, devitrification resistance and processability of the glass. Herein $R^{2+}$ represents $Mg^{2+}$, $Ca^{2+}$, $Sr^{2+}$ and $Ba^{2+}$. Higher light transmissivity in the visible range is expected for a near-infrared absorption filter. In order to improve the transmissivity in the visible range, the copper ion introduced in the glass must be $Cu^{2+}$ instead of $Cu^+$. If glass liquid is in reducing state, $Cu^{2+}$ will be converted to $Cu^+$, resulting in reduction of transmissivity around 400 nm. In the present invention, the total contents of $Mg^{2+}$, $Ca^{2+}$, $Sr^{2+}$ and $Ba^{2+}$ are properly increased to increase the alkali content of the glass liquid and to suppress reduction of $Cu^{2+}$ to $Cu^+$, thereby providing good near-infrared absorptivity for the glass. If the total contents of $Mg^{2+}$, $Ca^{2+}$, $Sr^{2+}$ and $Ba^{2+}$ are less than 30%, the transmissivity of the glass trends to decrease greatly. If the total contents are more than 65% devitrification resistance is poor. Therefore, the total contents of $Mg^{2+}$, $Ca^{2+}$, $Sr^{2+}$ and $Ba^{2+}$ are 30-65%, preferably 40-65%, more preferably more than 50% and no more than 65%, and optimally 54-65%.

$Mg^{2+}$ and $Ca^{2+}$ improve devitrification resistance, chemical stability and processability of the glass. $Mg^{2+}$ content is 0.1-10%, preferably 2-8%, and more preferably 3-7%. $Ca^{2+}$ content is 1-20%, preferably 5-15%, and more preferably 7-11%.

The present invention introduces high-contents $Sr^{2+}$ and $Ba^{2+}$ relatively to $Mg^{2+}$ and $Ca^{2+}$, and effectively increases $R^{2+}$ content. While $Sr^{2+}$ and $Ba^{2+}$ improve the transmissivity, they improve the devitrification resistance and meltability of the glass too. $Sr^{2+}$ content is preferably 15-35%, more preferably 21-30%, optimally 23-28%. Similarly, $Ba^{2+}$ content is 10-30%, preferably 15-30%, more preferably 21-30%, optimally 21-25%.

In the present invention, copper ion is a major indicator for the near-infrared absorption properties in the glass, and exists in the form of $Cu^{2+}$. When the $Cu^{2+}$ content is less than 0.1% in a near-infrared absorption filter, adequate near-infrared absorption can not be achieved. When the $Cu^{2+}$ content is more than 8%, devitrification resistance and glassing property deteriorate. Therefore, the $Cu^{2+}$ content is 0.1-8%, preferably 1.2-5% and more preferably 1.8-3%.

The glass according to the invention contains anions $O^{2-}$ and $F^-$. In the near-infrared absorption glass, it is easy to reduce $Cu^{2+}$ to $Cu^+$ when melting temperature is increased, and the glass becomes green from blue, thereby damaging the color sensitivity correction feature when the glass is used in a semiconductor imaging element.

$F^-$ is an anion component that reduces the melting temperature of the glass, and improves the chemical stability. In the present invention, when $F^-$ content is no more than 45%, chemical stability is reduced. When $F^-$ content is more than 60%, reduction of $Cu^{2+}$ can not be suppressed due to reduced $O^{2-}$ content, and coloration occurs around 400 nm due to $Cu^{2+}$. Therefore, the $F^-$ content is 45-60%, preferably 48-57%, more preferably more than 50% and no greater than 57%, further preferably 51-55% and optimally 51-53%.

$O^{2-}$ is an important anion component of the glass according to the invention. $O^{2-}$ content is equal to total anion content minus the $F^-$ content. When the $O^{2-}$ content is too low, $Cu^{2+}$ is reduced to $Cu^+$. Therefore, in the short wavelength range, especially around 400 nm, absorption increases until the glass shows a green color. When the $O^{2-}$ content is too high, the transmissivity is reduced as higher melting temperature results from the viscosity increase of the glass. Therefore, the $O^{2-}$ content is 40-55%, preferably 43-52%, more preferably no less than 43% and less than 50%, further preferably 45-49% and optimally 47-49%.

In the current invention, the $F^-$ connect is preferably and properly increased, and the $F^-$ connect is more than the $O^{2-}$ content to effectively reduce the melting temperature of the glass. The proper increase of $F^-$ provides good chemical stability for the glass. The $F^-$—$O^{2-}$ is preferably 0.1-20%, more preferably 0.1-10%, optimally 0.1-3%.

The following characteristic of the chemical stability of the glass is achieved via a specific component design: water resistant stability $D_W$ reaches Class 1; and acid resistant stability $D_A$ reaches Class 3, preferably Class 2.

Water resistant stability $D_W$ is tested by the sting method in GB/T17129 (a powder method) and is calculated using the following formula:

$$D_W=(B-C)/(B-A)*100$$

Wherein $D_W$—glass leaching percentage (%)
B—mass of filter and sample (g)
C—mass of filter and eroded sample (g)
C—mass of filter (g).

Based on the leaching percentage obtained by the calculation, the water resistant stability $D_W$ of optical glass is classified into 6 classes as shown in the following table.

| | Class | | | | | |
|---|---|---|---|---|---|---|
| | 1 | 2 | 3 | 4 | 5 | 6 |
| Leaching percentage ($D_W$) | <0.04 | 0.04-0.10 | 0.10-0.25 | 0.25-0.60 | 0.60-1.10 | >1.10 |

Acid resistant stability $D_A$ is tested using the testing method in GB/T17129 (a powder method) and is calculated using the following formula:

$$D_A=(B-C)/(B-A)*100$$

Wherein: $D_A$—glass leaching percentage (%)
B—mass of filter and sample (g)
C—mass of filter and eroded sample (g)
C—mass of filter (g).

Based on the leaching percentage obtained by the calculation, the acid resistant stability $D_A$ of optical glass is classified into 6 classes as shown in the following table.

|  | Class | | | | | |
|---|---|---|---|---|---|---|
|  | 1 | 2 | 3 | 4 | 5 | 6 |
| Leaching percentage ($D_A$) | <0.20 | 0.20-0.35 | 0.35-0.65 | 0.65-1.20 | 1.20-2.20 | >2.20 |

The preferable transmissivity characteristic of the glass according to the invention is given below:

When the glass is 1 mm thick, the spectral transmissivity at a wavelength ranging from 400 to 1200 nm has the following characteristics:

The transmissivity at a wavelength of 400 nm is no less than 80%, preferably no less than 85%, and more preferably no less than 88%.

The transmissivity at a wavelength of 500 nm is no less than 85%, preferably of no less than 88%, and more preferably no less than 90%.

The transmissivity at a wavelength of 600 nm is no less than 58%, preferably no less than 61%, and more preferably no less than 64%.

The transmissivity at a wavelength of 700 nm is no greater than 12%, preferably no greater than 10%, and more preferably no greater than 9%.

The transmissivity at a wavelength of 800 nm is no greater than 5%, preferably no greater than 3%, and more preferably of no greater than 2.5%, and more preferably no greater than 2%.

The transmissivity at a wavelength of 900 nm is no greater than 5%, preferably no greater than 3%, and more preferably no greater than 2.5%.

The transmissivity at a wavelength of 1000 nm is no greater than 7%, preferably no greater than 6%, and more preferably no greater than 5%.

The transmissivity at a wavelength of 1100 nm is no greater than 15%, preferably no greater than 13%, and more preferably no greater than 11%.

The transmissivity at a wavelength of 1200 nm is no greater than 24%, preferably no greater than 22%, and more preferably no greater than 2.1%.

That is to say, the absorption is high in the near-infrared area with a wavelength ranging from 700 nm to 1200 nm, and the absorption is low in the visible light area with a wavelength ranging from 400 nm to 600 nm.

In spectrum transmissivity at a wavelength ranging from 500 to 700 nm, the wavelength corresponding to the transmissivity of 50% (i.e. the wavelength value corresponding to $\lambda_{50}$) is 615±10 nm.

The transmissivity of the glass according to the invention refers to the value calculated by a spectrophotometer in the following manner: assuming that a glass sample has two optically polished planes parallel with each other, the light vertically enters one plane and departs from the other plane, the intensity of the departing light divided by that of the entering light is the transmissivity, also called external transmissivity.

According to the above characteristics of the glass according to the invention, color correction can be better achieved for semiconductor imaging elements such as CCD or CMOS.

The near-infrared absorption element according to the invention comprises the near-infrared absorption glass. The near-infrared absorption glass may also be used for laminated glass elements for the near-infrared absorption filter or lens. The near-infrared absorption glass is suitable for color correction for a solid image sensor, and has good transmission performance and chemical stability.

The near-infrared absorption filter according to the invention comprises the near-infrared absorption element comprising the near-infrared absorption glass. Thus, the near-infrared absorption filter has good light transmission and good chemical stability.

EXAMPLES

The following provides a more detailed description of the invention through the examples. However, the invention is not limited to the following examples.

Raw materials such as fluoride, metaphosphate, oxide, nitrate and carbonate are weighed according to Tables 1 and 2 in order to form the glass with the specified composition. After the components are fully mixed, the raw materials are transferred into a platinum crucible with a sealed cover, and are heated at 700-900° C. for meting. Oxygen is provided for clarity protection while homogenizing. The melted glass is made to continuously flow out through a temperature controlled pipe at a constant flow rate. The optical glass according to the invention is obtained after molding.

Examples 1-15

Examples for Manufacturing the Near-Infrared Absorption Glass

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Cation % | $P^{5+}$ | 27.5 | 24.2 | 19.6 | 21.7 | 22.2 | 23.1 | 21.0 | 25.0 | 18.7 | 25.4 |
|  | $Al^{3+}$ | 13.4 | 10 | 15.3 | 11.8 | 8.7 | 12.7 | 12.9 | 10.4 | 15.6 | 11.3 |
|  | $Li^+$ | 2.4 | 3.8 | 4.4 | 5.9 | 7.9 | 2.4 | 2.1 | 3.8 | 3.0 | 1.1 |
|  | $Na^+$ | 0.6 | 1.4 | 0 | 0 | 0 | 0 | 0 | 1.0 | 1.5 | 0 |
|  | $K^+$ | 0 | 0 | 0 | 0 | 0.5 | 0 | 0 | 0 | 2 | 0 |
|  | $R^{2+}$ | 54.4 | 56.2 | 57.4 | 57.9 | 60.3 | 59.6 | 61.1 | 58.0 | 55.8 | 61.2 |
|  | $Mg^{2+}$ | 2.8 | 6.8 | 3.6 | 7.2 | 4.4 | 4.6 | 4.8 | 3.9 | 7.1 | 3.1 |
|  | $Ca^{2+}$ | 7.1 | 3.9 | 11.5 | 6.9 | 16.1 | 9.9 | 10.5 | 12.5 | 7.7 | 8.4 |
|  | $Sr^{2+}$ | 27.6 | 29.1 | 22.7 | 18.9 | 16.1 | 24.8 | 25.1 | 22.7 | 23.4 | 27.1 |

TABLE 1-continued

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
|  | $Ba^{2+}$ | 16.9 | 16.4 | 19.6 | 24.9 | 23.7 | 20.3 | 20.7 | 18.9 | 17.6 | 22.6 |
|  | $Cu^{2+}$ | 1.7 | 4.4 | 3.3 | 2.7 | 0.4 | 2.2 | 2.9 | 1.8 | 3.4 | 1.0 |
| Total |  | 100.0 | 100.0 | 100.0 | 100.0 | 100.0 | 100.0 | 100.0 | 100.0 | 100.0 | 100.0 |
| Anion % | $F^-$ | 52.8 | 54.4 | 53.8 | 55.1 | 51.7 | 51.5 | 52.4 | 51.3 | 52.8 | 50.7 |
|  | $O^{2-}$ | 47.2 | 45.6 | 46.2 | 44.9 | 48.3 | 48.5 | 47.6 | 48.7 | 47.2 | 49.3 |
| Total |  | 100.0 | 100.0 | 100.0 | 100.0 | 100.0 | 100.0 | 100.0 | 100.0 | 100.0 | 100.0 |
| $D_W$ |  | 1 | 1 | 1 | 1 | 1 | 1 | 1 | 1 | 1 | 1 |
| $D_A$ |  | 2 | 2 | 2 | 3 | 3 | 2 | 2 | 2 | 2 | 3 |

TABLE 2

|  |  | Example | | | | |
|---|---|---|---|---|---|---|
|  |  | 11 | 12 | 13 | 14 | 15 |
| Cation % | $P^{5+}$ | 23.5 | 22.9 | 20.1 | 21.0 | 23.7 |
|  | $Al^{3+}$ | 11.9 | 12.1 | 12.8 | 12.8 | 13.7 |
|  | $Li^+$ | 1.8 | 2.3 | 3.4 | 2.9 | 3.7 |
|  | $Na^+$ | 1.7 | 1.4 | 0 | 0 | 1.5 |
|  | $K^+$ | 0 | 0 | 0 | 0 | 0 |
|  | $R^{2+}$ | 59 | 59.1 | 61.2 | 61.3 | 56.2 |
|  | $Mg^{2+}$ | 4.9 | 4.3 | 4.6 | 5.3 | 3.3 |
|  | $Ca^{2+}$ | 9.1 | 10.2 | 11.1 | 10.9 | 8.5 |
|  | $Sr^{2+}$ | 26.2 | 25.1 | 23.9 | 24.2 | 23.7 |
|  | $Ba^{2+}$ | 18.8 | 19.5 | 21.6 | 20.9 | 20.7 |
|  | $Cu^{2+}$ | 2.1 | 2.2 | 2.5 | 2.0 | 1.2 |
| Total |  | 100.0 | 100.0 | 100.0 | 100.0 | 100.0 |
| Anion % | $F^-$ | 47 | 51.8 | 48.4 | 51.3 | 49.1 |
|  | $O^{2-}$ | 53 | 48.2 | 51.6 | 48.7 | 50.9 |
| Total |  | 100.0 | 100.0 | 100.0 | 100.0 | 100.0 |
| $D_W$ |  | 1 | 1 | 1 | 1 | 1 |
| $D_A$ |  | 3 | 2 | 2 | 2 | 2 |

In Tables 1-2 $R^{2+}$ is the total content of $Mg^{2+}$, $Ca^{2+}$, $Sr^{2+}$ and $K^{2+}$.

The glass is processed into a tabular form. The two opposite sides are subject to optical polishing before being used as samples for transmissivity measurements. Light transmissivity of each sample is measured using an optical transmissometer at a typical wavelength on a 1 mm thick sample.

Tables 3-4 show the transmissivity of 1 mm thick glass according to the invention. The data demonstrate that the glass has good performance in color sensitivity correction for semiconductor imaging elements.

TABLE 3

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Transmissivity (%) | 400 nm | 83 | 85 | 82.5 | 81 | 85 | 81.6 | 83.5 | 88.1 | 83.2 | 88.3 |
|  | 500 nm | 88 | 89 | 87 | 88 | 88.1 | 88.3 | 88 | 90.9 | 88 | 90.9 |
|  | 600 nm | 63 | 65 | 63 | 62.4 | 61.4 | 63.6 | 64 | 63 | 61.7 | 63 |
|  | 700 nm | 10 | 8 | 8.4 | 9 | 8.5 | 9.4 | 8.7 | 8.2 | 8 | 8.1 |
|  | 800 nm | 1.5 | 2 | 1.4 | 1.6 | 2.3 | 2.1 | 1.7 | 2.1 | 1.2 | 1.8 |
|  | 900 nm | 3 | 3 | 2.5 | 2.2 | 2 | 3 | 2.3 | 2.5 | 2.3 | 2.1 |
|  | 1000 nm | 5 | 6 | 5.4 | 4.8 | 4.6 | 4.3 | 5 | 4.2 | 4.4 | 4.5 |
|  | 1100 nm | 10.5 | 10.5 | 10.3 | 10.7 | 10.8 | 10.4 | 10.5 | 10.3 | 11.5 | 10.5 |
|  | 1200 nm | 21 | 20.4 | 20 | 20.6 | 20.2 | 21 | 20.8 | 20 | 20 | 21 |
| $\lambda_{50}$ (nm) |  | 615 | 622 | 614 | 616 | 609 | 615 | 616 | 616 | 618 | 624 |

TABLE 4

|  |  | Example | | | | |
|---|---|---|---|---|---|---|
|  |  | 11 | 12 | 13 | 14 | 15 |
| Transmissivity (%) | 400 nm | 82 | 82.3 | 81.6 | 82.8 | 83 |
|  | 500 nm | 88.5 | 88.4 | 88 | 88 | 88 |
|  | 600 nm | 64.5 | 63.2 | 64 | 64.2 | 64.6 |
|  | 700 nm | 11.6 | 11 | 10 | 10.1 | 10.2 |
|  | 800 nm | 2.2 | 2.4 | 2.3 | 2.3 | 2.1 |
|  | 900 nm | 3.3 | 3 | 3.4 | 3 | 3 |
|  | 1000 nm | 6.4 | 6.6 | 6 | 6.3 | 6 |
|  | 1100 nm | 12.2 | 12.7 | 12 | 12 | 12.6 |
|  | 1200 nm | 22.8 | 23.1 | 21 | 22 | 23 |
| $\lambda_{50}$ (nm) |  | 617 | 612 | 609 | 624 | 616 |

FIG. 1 shows the transmissivity curve for Example 1. It can be seen from the FIGURE that when the glass is 1 mm thick, the transmissivity is more than 80% at a preferable wavelength of 400 nm. At 500-700 nm, the wavelength corresponding to the transmissivity of 50% is 615±10 nm. At 400-1200 nm, the transmissivity is lowest at a wavelength of 800-1000 nm. Because in the near-infrared range, the sensitivity of the semiconductor imaging element is not very low, therefore the transmissivity of the filter for color correction needs to be suppressed to minimize sensitivity. At 1000-1200 nm, the sensitivity of the semiconductor imaging elements is relatively low, so the transmissivity of the glass according to the invention is increased.

While the invention has been described in detail and with reference to specific examples thereof, it will be apparent to one skilled in the art that various changes and modifications can be made therein without departing from the spirit and scope thereof.

What is claimed is:

1. A near-infrared absorption glass comprising $P^{5+}$, $Al^{3+}$, $Li^+$, $R^{2+}$, $Cu^{2+}$, $O^{2-}$ and $F^-$, wherein the $R^{2+}$ is 54-65% by cation weight and comprises a combination of $Mg^{2+}$, $Ca^{2+}$, $Sr^{2+}$ and $Ba^{2+}$; wherein $F^-$ and $O^{2-}$ comprise 100% of the anion content and $O^{2-}$ comprises 40-55% by anion weight; and wherein the near-infrared absorption glass comprises: a transmissivity of more than 80% at 400 nm, more than 85% at 500 nm, and more than 58% at 600 nm, further wherein the transmissivity is measured through a near-infrared absorption glass having a thickness of 1 mm; a water resistant stability $D_W$ of the near-infrared absorption glass is Class 1; and an acid resistant stability $D_A$ is above Class 4.

2. The near-infrared absorption glass of claim 1, wherein the transmissivity is more than 88% at 400 nm, and more than 90% at 500 nm.

3. The near-infrared absorption glass of claim 1, wherein the near-infrared absorption glass comprises by cation weight: 15-35% of $P^{5+}$, 5-20% of $Al^{3+}$, 1-15% of $Li^+$, 0-10% of $Na^+$ and 0.1-8% of $Cu^{2+}$.

4. The near-infrared absorption glass of claim 1, wherein the near-infrared absorption glass comprises by cation weight: 15-35% of $P^{5+}$, 5-20% of $Al^{3+}$, 1-10% of $Li^+$, 0-10% of $Na^+$ and 0.1-8% of $Cu^{2+}$.

5. The near-infrared absorption glass of claim 1, wherein the near-infrared absorption glass comprises by cation weight: 15-35% of $P^{5+}$, 5-20% of $Al^{3+}$, 2-5% of $Li^+$, 0-10% of $Na^+$ and 0.1-8% of $Cu^{2+}$.

6. The near-infrared absorption glass of claim 1, wherein the near-infrared absorption glass comprises by cation weight: 20-30% of $P^{5+}$, 10-15% of $Al^{3+}$, 1-15% of $Li^+$, 0-5% of $Na^+$ and 1.2-5% of $Cu^{2+}$.

7. The near-infrared absorption glass of claim 1, wherein the near-infrared absorption glass comprises by cation weight: 20-30% of $P^{5+}$, 10-15% of $Al^{3+}$, 1-10% of $Li^+$, 0-5% of $Na^+$ and 1.2-5% of $Cu^{2+}$.

8. The near-infrared absorption glass of claim 1, wherein the near-infrared absorption glass comprises by cation weight: 20-30% of $P^{5+}$, 10-15% of $Al^{3+}$, 2-5% of $Li^+$, 0-5% of $Na^+$ and 1.2-5% of $Cu^{2+}$.

9. The near-infrared absorption glass of claim 1, wherein the near-infrared absorption glass comprises by cation weight: 21-25% of $P^{5+}$, 10-15% of $Al^{3+}$, 1-15% of $Li^+$, 0.5-3% of $Na^+$ and 1.2-5% of $Cu^{2+}$.

10. The near-infrared absorption glass of claim 1, wherein the near-infrared absorption glass comprises by cation weight: 21-25% of $P^{5+}$, 10-15% of $Al^{3+}$, 1-10% of $Li^+$, 0.5-3% of $Na^+$ and 1.2-5% of $Cu^{2+}$.

11. The near-infrared absorption glass of claim 1, wherein the near-infrared absorption glass comprises by cation weight: 21-25% of $P^{5+}$, 10-15% of $Al^{3+}$, 2-5% of $Li^+$, 0.5-3% of $Na^+$ and 1.2-5% of $Cu^{2+}$.

12. The near-infrared absorption glass of claim 1, wherein the near-infrared absorption glass comprises by cation weight: 15-35% of $P^{5+}$, 5-20% of $Al^{3+}$, 1-15% of $Li^+$, 0-10% of $Na^+$, 0-3% of $K^+$, 0.1-8% of $Cu^{2+}$, 0.1-10% of $Mg^{2+}$, 1-20% of $Ca^{2+}$, 15-35% of $Sr^{2+}$ and 10-30% of $Ba^{2+}$.

13. The near-infrared absorption glass of claim 1, wherein the near-infrared absorption glass comprises by cation weight: 20-30% of $P^{5+}$, 10-15% of $Al^{3+}$, 1-10% of $Li^+$, 0-5% of $Na^+$, 0-3% of $K^+$, 1.2-5% of $Cu^{2+}$, 2-8% of $Mg^{2+}$, 5-15% of $Ca^{2+}$, 21-30% of $Sr^{2+}$ and 15-30% of $Ba^{2+}$.

14. The near-infrared absorption glass of claim 1, wherein the near-infrared absorption glass comprises by cation weight: 21-25% of $P^{5+}$, 10-15% of $Al^{3+}$, 2-5% of $Li^+$, 0.5-3% of $Na^+$, 1.8-3% of $Cu^{2+}$, 3-7% of $Mg^{2+}$, 7-11% of $Ca^{2+}$, 23-28% of $Sr^{2+}$ and 21-30% of $Ba^{2+}$.

15. The near-infrared absorption glass of claim 1, wherein the near-infrared absorption glass comprises by cation weight: 21-25% of $P^{5+}$, 10-15% of $Al^{3+}$, 2-5% of $Li^+$, 0.5-3% of $Na^+$, 1.8-3% of $Cu^{2+}$, 3-7% of $Mg^{2+}$, 7-11% of $Ca^{2+}$, 23-28% of $Sr^{2+}$ and 21-25% of $Ba^{2+}$.

16. The near-infrared absorption glass of claim 1, wherein the near-infrared absorption glass comprises by anion weight: 48-57% of $F^-$ and 43-52% of $O^{2-}$.

17. The near-infrared absorption glass of claim 1, wherein the near-infrared absorption glass comprises $F^-$ and $O^{2-}$, wherein $F^-$ is more than 50% but no more than 57% by anion weight, and wherein $O^{2-}$ is no less than 43% but less than 50% by anion weight.

18. The near-infrared absorption glass of claim 1, wherein the near-infrared absorption glass comprises by anion weight: 51-55% of $F^-$ and 45-49% of $O^{2-}$.

19. The near-infrared absorption glass of claim 1, wherein the near-infrared absorption glass comprises by anion weight: 51-53% of $F^-$ and 47-49% of $O^{2-}$.

20. A near-infrared absorption element comprising the near-infrared absorption glass of claim 1.

21. A near-infrared absorption filter comprising the near-infrared absorption glass of claim 1.

* * * * *